United States Patent
Brennan et al.

[19]

[11] Patent Number: 6,120,155

[45] Date of Patent: Sep. 19, 2000

[54] REFLECTOR DEVICE AND SYSTEM FOR VIEWING THE REAR SEAT OF A VEHICLE

[75] Inventors: Marianne Brennan, 60 Withrow Avenue, Toronto, Ontario, Canada, M4K 1C9; Ian F. Norton, Toronto, Canada

[73] Assignee: Marianne Brennan, Toronto, Canada

[21] Appl. No.: 09/076,799

[22] Filed: May 13, 1998

[51] Int. Cl.⁷ .................................................. G02B 5/08
[52] U.S. Cl. ...................... 359/857; 359/858; 359/859; 359/862; 359/871; 359/872; 359/873
[58] Field of Search .................................. 359/857, 858, 359/859, 862, 871, 872, 873; 340/326, 555; 40/417, 467, 705, 796

[56] References Cited

U.S. PATENT DOCUMENTS

| | | | |
|---|---|---|---|
| 4,702,572 | 10/1987 | Cossey | 359/876 |
| 4,712,892 | 12/1987 | Masucci | 359/871 |
| 4,733,956 | 3/1988 | Erickson | 350/624 |
| 4,902,118 | 2/1990 | Harris | 350/631 |
| 4,909,618 | 3/1990 | Gardner | 350/623 |
| 5,103,347 | 4/1992 | Lumbra et al. | 359/891 |
| 5,285,321 | 2/1994 | Nolan-Brown | 359/857 |
| 5,668,526 | 9/1997 | Collins | 340/326 |

*Primary Examiner*—Cassandra Spyrou
*Assistant Examiner*—Mohammad Y. Sikder
*Attorney, Agent, or Firm*—Christopher R. Scott; Dolly Kao

[57] ABSTRACT

The invention provides a reflector device and a reflector system for mounting to a vehicle having front and rear seats to allow a person in the front seat to view an infant in a rearwardly facing safety seat attached to the rear seat. The reflector system includes a pair of reflector devices of which one may be in accordance with the invention. The reflector device in accordance with the invention is mountable upright on a back of the rear seat and includes a mounting assembly and a reflector with a forwardly-facing reflecting surface pivotally connected to the mounting assembly so as to be pivotable in three-dimensions. The reflector device is preferably mounted to one side of the infant and has an upward extent below the rear window of the vehicle so as not to obstruct a driver's view through the rear window and to not present a hazard to the infant.

4 Claims, 3 Drawing Sheets

REFLECTOR DEVICE AND SYSTEM FOR VIEWING THE REAR SEAT OF A VEHICLE

FIELD OF THE INVENTION

The invention relates to reflector devices and reflector systems for use in a vehicle having front and rear seats, to allow a person in the front seat to view an infant in a rearwardly facing safety seat attached to the rear seat.

BACKGROUND OF THE INVENTION

When travelling with an infant in a vehicle having front and rear seats such as an automobile, truck, van, or the like, it is most preferable, if not by law required, to place the infant in the rear seat of the vehicle due to safety considerations or other reasons such as the presence of another passenger occupying the front passenger seat.

Often the infant is placed in a rearwardly facing safety seat in the rear seat. A problem therefore arises that the infant is not visible by a driver or other person in the front seat. All that can be seen is the back of the safety seat, particularly where the safety seat also includes sides thereon. As a result, the state or condition of the infant cannot be determined without stopping the vehicle or bending over the back of the front seat while driving, the latter being obviously dangerous.

U.S. Pat. Nos. 4,702,572 to Cossey and 4,712,892 to Masucci each teach solutions to this problem.

The patent to Cossey discloses a system, for viewing an infant in the rear seat of a vehicle, utilizing a mirror attached by means of a mounting bracket to the top of the rear seat back. The mirror is pivotally connected by means of a ball and socket adjustment to an upper end of a telescopic vertical adjustment which extends upwardly from a spring biased mounting bracket. The position of the mirror in the system obstructs the driver's view through the rear window of the vehicle which may impair safe driving.

Further, the mounting bracket is not suitable for attachment to seat backs of varying thickness dimensions. The arrangement must therefore be manufactured using brackets of different sizes for fitting to existing car seats.

U.S. Pat. No. 4,712,892 to Masucci discloses a reflector device including a non-glass planar mirror, which device is for mounting below an upper edge of the rear seat back and directly in front of an infant in a rearwardly facing safety seat. While the device has the advantage of providing an unobstructed view through the rear window, a person in the front seat must either turn around and look at the reflector directly to view the infant, or adjust the rear view mirror so that it is directed towards the mirror of the reflector device. In the latter case, the rear view mirror is no longer effective in providing a view through the rear window. This presents a danger to driving. In order that the rear view mirror may be used to view both the infant and the rearward driving conditions through the rear window, the rear view mirror must be alternately adjusted to perform these two functions.

Another problem with the disclosed device is that the mirror is not adjustable about a vertical axis. The device must be mounted directly in front of the infant to function for the stated purpose. Thus, in front or rear end collisions, or when coming to a sudden stop, there is a possibility that the infant may be forced into the device and suffer consequent harm.

Further, in a vehicle having only two seats in the rear seat, it is very difficult to position the mirror on the seat back in such a way that an image of the infant is reflected to the rear view mirror for viewing. One must, in most cases, turn around to view the mirror directly to see the infant.

It is an object of the invention to alleviate the above mentioned problems in the prior art.

SUMMARY OF THE INVENTION

In accordance with one aspect of the invention, there is provided a reflector device for upright mounting in a vehicle having front and rear seats to allow a person in the front seat to view an infant in a rearwardly facing safety seat attached to a back of the rear seat. The device is adapted to provide an unobstructed view for the driver through the rear window and includes a mounting bracket releasably attachable to the back of the rear seat and a reflector pivotally coupled to the mounting bracket. The mounting bracket has a first bracket portion defining an upward extent of the mounting bracket and having a forward first end. The mounting bracket further includes a second bracket portion extending angularly and downwardly with respect to the first bracket portion from the first end and having a forward side and a second end remote from the first bracket portion. The reflector is pivotally coupled to the forward side of the second bracket portion and is pivotable in three dimensions. The reflector has a reflecting surface facing away from the second bracket portion and is proportioned to have a similar upward extent to that of the mounting bracket. In use, the device is releasably mounted on the rear seat off to one side of the infant with the first bracket portion disposed on an upper edge of the back of the rear seat and the second bracket portion extending downwardly in contact with the seat, such that the device provides an unobstructed view for the driver through the rear window of the vehicle and the reflector is adjustable to allow the person to view the infant by looking at the reflector directly or indirectly via a rear view mirror of the vehicle.

In accordance with another aspect, the invention provides a reflector system mounted in a vehicle, the vehicle having front and rear seats, the system for allowing a person in the front seat to view an infant in a rearwardly facing safety seat attached to the rear seat. The system includes a first adjustable reflector device releasably mounted on a portion of an interior of the vehicle forwardly of the person and spaced from a rear view mirror of the vehicle. The system further includes a second adjustable reflector device releasably mounted on the rear seat of the vehicle. The first and second adjustable reflectors have rearwardly and forwardly facing reflecting surfaces respectively and are arrangeable such that an image of the infant is reflected by the second reflector to the first reflector which is then viewable by the person looking at the first reflector.

BRIEF DESCRIPTION OF THE PREFERRED EMBODIMENT

A preferred embodiment of the invention will now be described with reference to the drawings in which.

DETAILED DESCRIPTION OF THE PREFERRED EMBODIMENT

Figure 1:
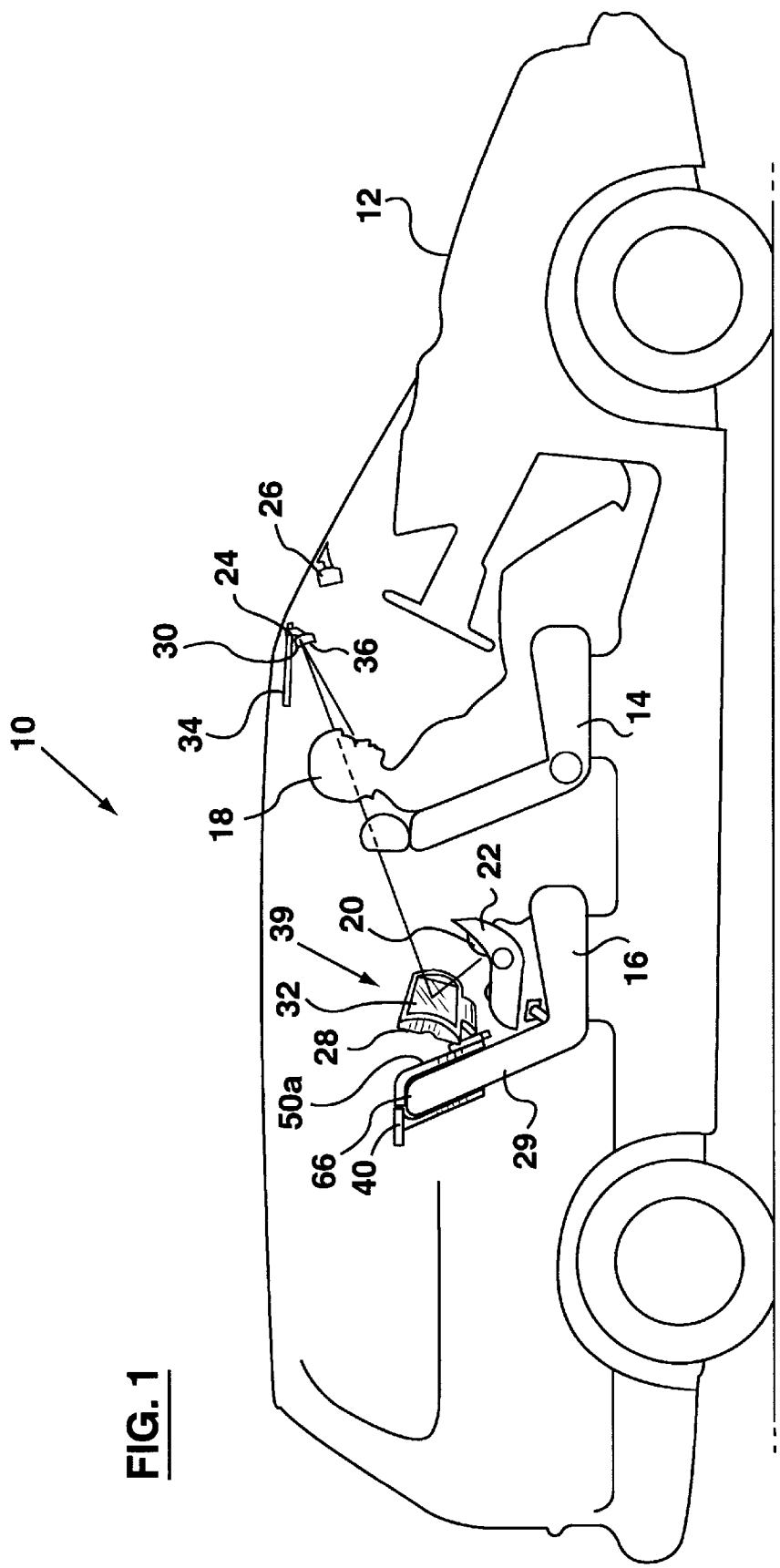
FIG. 1 is a schematic side elevation view of a reflector system, according to the preferred embodiment, mounted in a vehicle, which system includes first and second reflector devices.
Figure 2:
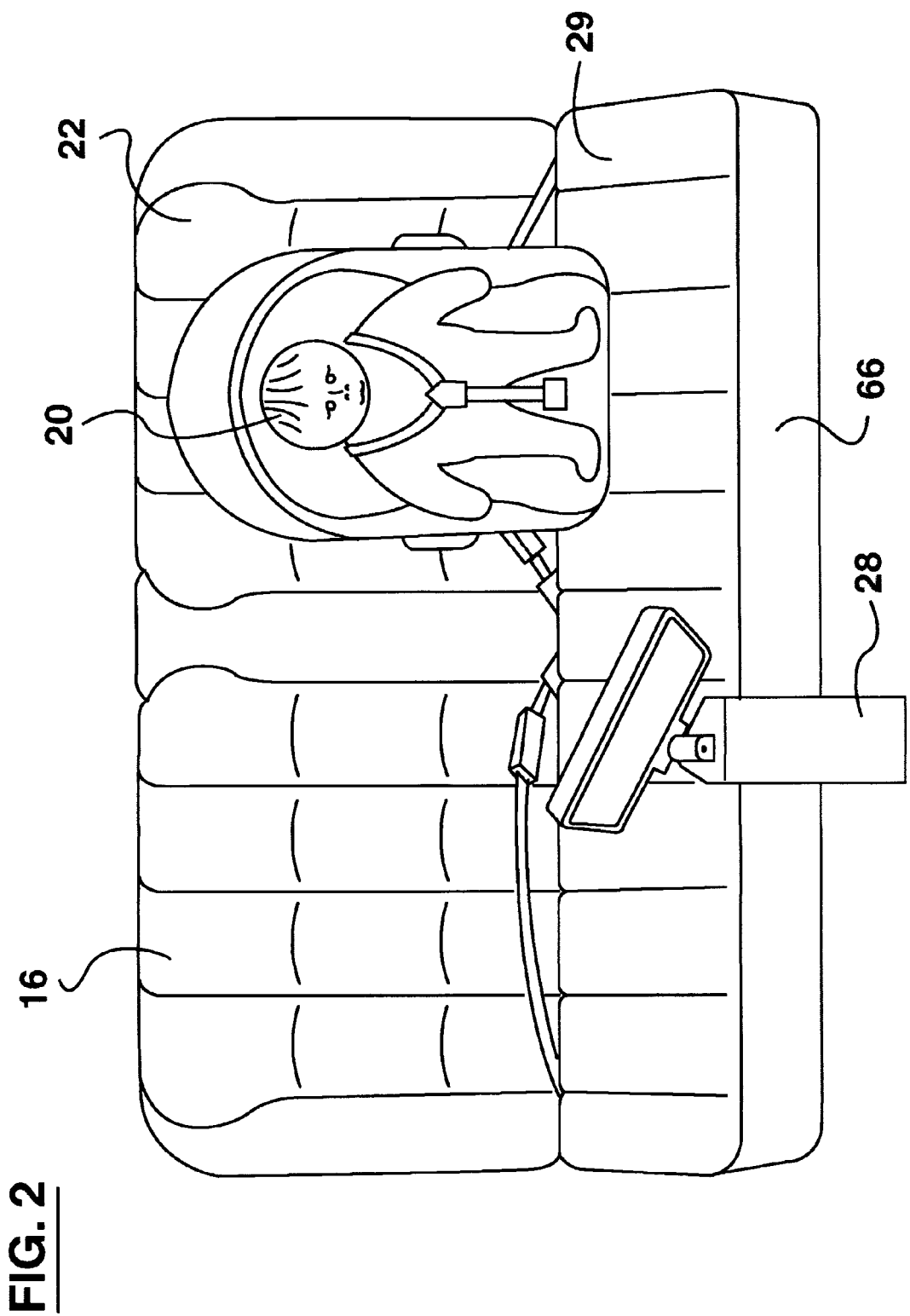
FIG. 2 is a schematic top view of the rear seat of the vehicle showing the second reflector device mounted in a preferred position off to one side of the infant in the rearwardly facing safety seat.

Referring mainly to FIG. 1 but with reference also to FIG. 2, a reflector system, designated generally by reference numeral 10, is shown mounted to an interior of a vehicle 12 having front and rear seats 14, 16. The system 10 allows a driver 18 in the front seat 14 to view an infant 20 in a rearwardly facing safety seat 22 attached to the rear seat 16.

The system 10 includes an adjustable first reflector device 24 releasably mounted on a portion of the interior of the vehicle 12 forwardly of the driver 18 and spaced from a rear view mirror 26. The system 10 further includes an adjustable second reflector device 28 releasably mounted on a back 29 of the rear seat 16 of the vehicle 12 off to one side of the infant 20 (as can be seen more clearly in FIG. 2). The first and second reflector devices 24, 28 have rearwardly and forwardly facing reflecting surfaces 30, 32, respectively, and are arrangeable such that an image of the infant 20 is reflected by the second reflector device 28 to the first reflector device 24 which is then viewable by the driver 18 looking at the first reflector device 24.

The system 10 allows the use of the rear view mirror 26 for its usual purpose of providing a view through the rear window (not shown). This view is unobstructed by the second reflector 28 due to its structure, which will be described. Further, the mounting of the second reflector device 28 off to one side of the infant 20 minimizes the possibility of injury to the infant through contact between the infant and the device in collisions or sudden stopping of the vehicle.

The first reflector device 24 is a known device having a clip element (not shown) used for mounting the device 24 to a visor 34 of the vehicle. A reflector 36 of the first reflector device 24 is coupled to the clip element via a pair of ball and socket joints arranged in series to adapt the reflector 36 for pivotal motion in three dimensions, and more particularly, in alignment with the second reflector device 28 such that an image of the infant 20 is conveyed to the driver 18 looking at the first reflector device 24.

Figure 3:
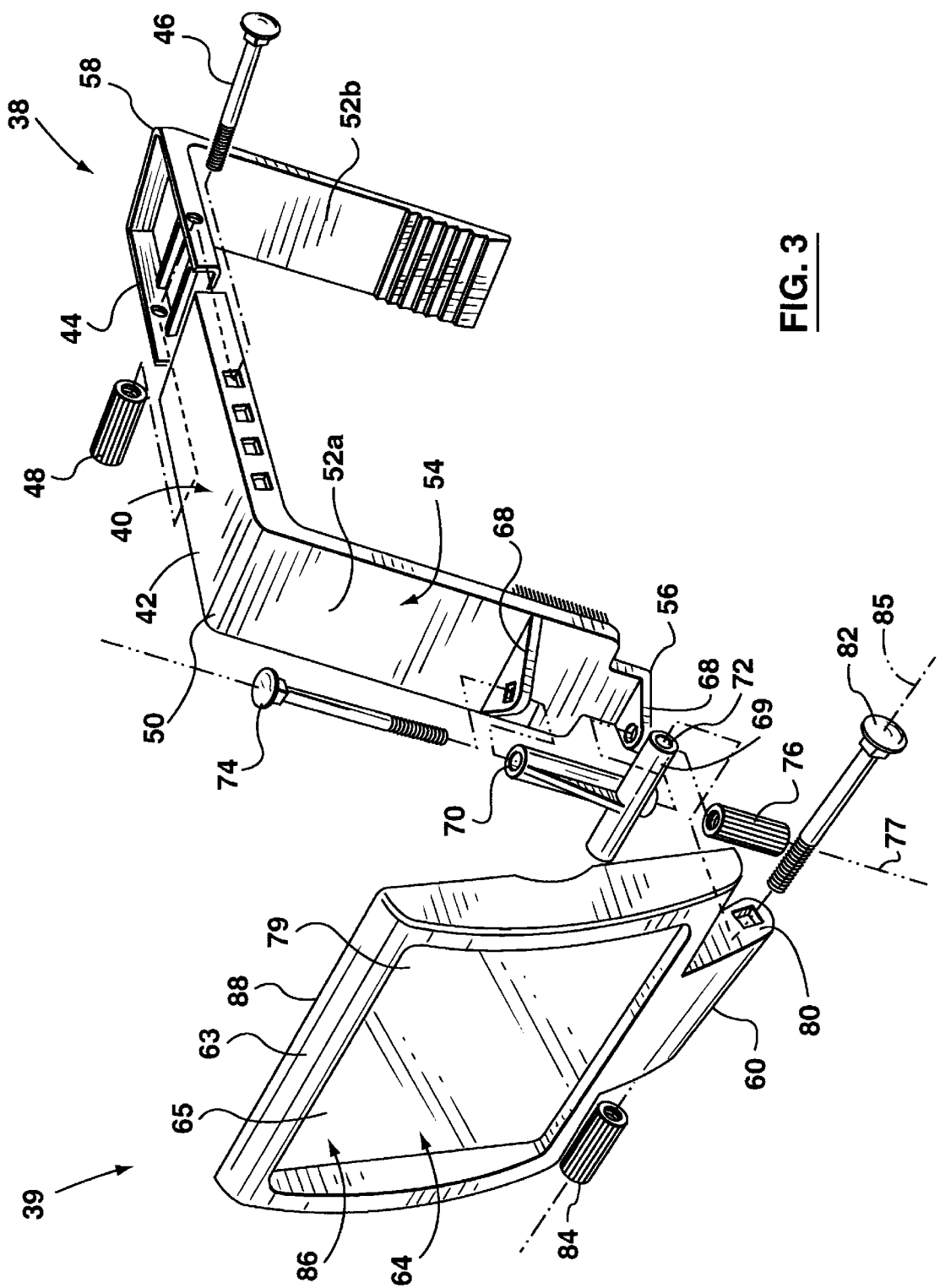
FIG. 3 is an isometric assembly drawing of the second reflector device of FIG. 1.

Referring to FIG. 3, the second reflector device 28 has a U-shaped mounting bracket, designated generally by numeral 38, releasably attachable to the back 29, and a reflector, designated generally by reference numeral 39, pivotally coupled to the mounting bracket 38.

The mounting bracket 38 has a first bracket portion defining an upward extent of the mounting bracket 38 in the form of a two-part bridge 40 of the U-shaped mounting bracket 38. The bridge 40 includes apertured complimentary bridge portions 42, 44, releasably securable together at various relative positions by means of screw 46 and screw retainer 48. The first bracket portion has a forward first end in the form of forward end 50 of the first bridge portion 42. The mounting bracket 38 further includes a second bracket portion extending angularly and downwardly with respect to the first bracket portion in the form of extension 52a integrally formed with the first bridge portion 42 at the forward end 50. The extension 52a has a forward side 54 and a second end 56 remote from the bridge 40. The second bridge portion 44 has a rearward end 58. An extension 52b is integrally formed with the second bridge portion 44 at the rearward end 58 and extends angularly and downwardly with respect to the second bridge portion 44. The mounting bracket 38 therefore has a pair of substantially parallel extensions 52a, 52b securable at varying distances from each other by virtue of the various relative positions to which the first and second bridge portions 42, 44 may be secured, and is thereby adapted for releasable clamping engagement with an upper portion of the back 29.

The reflector 39 has a lower end 60 pivotally coupled to the forward side 54 of the extension 52a at the second end 50 so as to be pivotable in three dimensions, as will be further described. The reflector 39 has a mirror retainer 63 to which is attached a plastic mirror 65. The mirror has a reflecting surface 64 facing away from the extension 52a. The reflector 39 is proportioned to have a similar upward extent to that of the mounting bracket 38.

Referring again to FIG. 1, when in use, the second reflector device 28 is releasably mounted on the rear seat back 29 off to one side of the infant 20 (FIG. 2), with the bridge 40 disposed on an upper edge 66 of the back 29 and the extension 50a extending downwardly in contact with the seat, such that the device 28 is in front of the seat 16 and provides an unobstructed view for the driver 18 of the rear window of the vehicle 12 and the reflector 39 is adjustable to allow the driver 18 to view the infant 20 by looking at the reflector 39 directly or indirectly via the rear view mirror 26.

Referring again to FIG. 3, the extension 52a includes a pair of integral, apertured pivot retainers 68 extending forwardly of the extension 52a and spaced from each other along the extension 52a with one of the pair of pivot retainers located at the second end 56. The mounting bracket 38 includes a T-shaped pivot 69 having first and second bores 70, 72 extending perpendicularly to each other. The pivot 69 is received by the pivot retainers 68 with the first bore 70 in registering alignment with the apertures of the pivot retainers 68, the pivot 69 being retained in the pivot retainers 68 by bolt 74 and bolt retainer 76 so as to be pivotable with respect to the extension 52a about a first axis 77 of the pivot. Also, mirror retainer 63 of the reflector 39 has a pair of laterally spaced, integral rearwardly extending apertured pivot retainers 80 at a lower end 60 of the reflector 39. The apertures of the pivot retainers 80 are brought in registering alignment with the second bore 72, the reflector 39 being pivotally secured to the pivot 69 by means of a second bolt 82 and second bolt retainer 84 and pivotable about a second axis 85 of the pivot 69. The reflector 39 is therefore pivotable with respect to the extension 52a in three dimensions.

The mirror retainer 63 has a rearward peripheral portion (not shown) and an opening 86. The forward facing reflecting surface 64 of the mirror 65 has a peripheral portion snapped in place in the mirror retainer 63 by integrally molded darts (not shown) in the peripheral portion of the mirror retainer 63. A remainder of the reflecting surface of the mirror 65 is exposed through the opening 86.

It will be appreciated that the foregoing description is by way of example only and is not meant to limit the scope of the invention as defined in the appended claims.

For instance, any part of the reflector 39 may be pivotally coupled to the extension 52a at any location along the length of the extension 52a provided that an upper extent of the reflector is disposed substantially at the same level as the upper extent of the mounting bracket 38 defined by the bridge 40 in order that the second reflector device 28 provides an unobstructed view to the driver of the rear window of the vehicle. Thus, an upper end 88 of the reflector 39 may actually extend slightly above the bridge 40.

Similarly, it will be appreciated that the reflector 39 may be mounted to the extension 52a in any number of ways permitting pivotal motion of the reflector 39 in three dimensions. For example, the pivot 69 may be a ball and socket joint or any other kind of three dimensional joint as is common in the art.

Additionally, the mounting bracket 38 may be formed without the second extension 52b described in the preferred embodiment. In such case, the bridge 40 may be formed in one piece and bolted to a shelf of the vehicle disposed rearwardly of and adjacent to the upper edge 66 of the rear seat back 29.

It should also be evident that the second reflector device 28 may be used alone rather than in combination with the first reflector device 24. In this case, the reflecting surface 64 of the mirror 65 may be adjusted to allow a person in the front seat to view the infant either by turning around to view the mirror 65 directly or indirectly via the rear view mirror 26. In any event, for optimum safety, the second reflector device 28 should be mounted off to one side of the infant so as not to pose a risk of harm to the infant.

It will be further appreciated that a system or second reflector device according to the invention may be used by either a driver or a person in the front passenger seat to view an infant. In the system, the first reflector device may be mounted such that quick adjustment thereof allows either the driver or the person in the front passenger seat to view the infant utilizing the system.

I claim:

1. A reflector device for upright mounting in a vehicle having front and rear seats to allow a driver in the front seat to view an infant in a rearwardly facing safety seat attached to a back of the rear seat, the device being adapted to provide an unobstructed view for the driver through a rear window of the vehicle, and comprising:

a U-shaped mounting bracket releasably attachable to said back, the bracket having a bridge defining an upward extent of the mounting bracket, and having a forward first end;

a second bracket portion extending angularly and downwardly with respect to the bridge from said first end and having a forward side and a second end remote from the bridge, the second bracket portion being one of a pair of substantially parallel extensions extending angularly and downwardly from the bridge, the extensions being securable at varying distances from each other so that the mounting bracket is adapted for releasable clamping engagement with an upper portion of the back; and a reflector pivotally coupled to the forward side of the second bracket portion and being pivotable in three dimensions, the reflector having a reflecting surface facing away from the second bracket portion and being proportioned to have a similar upward extent to that of the mounting bracket;

whereby, in use, the device is releasably mounted on the rear seat off to one side of the infant with the bridge disposed on an upper edge of the back and said second bracket portion extending downwardly in contact with the seat, such that the device is in front of the seat and provides an unobstructed view for the driver of the rear window of the vehicle, and the reflector is adjustable to allow the person to view the infant by looking at the reflector directly or indirectly via a rear view mirror of the vehicle.

2. A reflector device according to claim 1 in which the reflector is pivotally coupled to said second end of the second bracket portion.

3. A reflector device according to claim 2 wherein the reflector has an upper end and a lower end, said lower end of the reflector being pivotally coupled to the second bracket portion.

4. A reflector device for upright mounting in a vehicle having front and rear seats to allow a driver in the front seat to view an infant in a rearwardly facing safety seat attached to a back of the rear seat, the device being adapted to provide an unobstructed view for the driver through a rear window of the vehicle, and comprising:

a mounting bracket releasably attachable to said back, the bracket having a bridge defining an upward extent of the mounting bracket, and having a forward first end;

a second bracket portion extending angularly and downwardly with respect to the bridge from said first end and having a forward side and a second end remote from the bridge, and the mounting bracket having a pivot pivotally mounted to said forward side of said second bracket portion, the pivot being pivotable about a first axis of the pivot;

a reflector pivotally mounted to said pivot so as to be pivotable about a second axis of the pivot, said second axis extending transversely to said first axis so that the reflector is pivotable in three dimensions, the reflector having a reflecting surface facing away from the second bracket portion and being proportioned to have a similar upward extent to that of the mounting bracket;

whereby, in use, the device is releasably mounted on the rear seat off to one side of the infant with the bridge disposed on an upper edge of the back and said second bracket portion extending downwardly in contact with the seat, such that the device is in front of the seat and provides an unobstructed view for the driver of the rear window of the vehicle, and the reflector is adjustable to allow the person to view the infant by looking at the reflector directly or indirectly via a rear view mirror of the vehicle.

* * * * *